(12) United States Patent
Lee et al.

(10) Patent No.: US 7,120,087 B2
(45) Date of Patent: Oct. 10, 2006

(54) ELECTRONICS-CARRYING MODULE

(75) Inventors: Paul Lee, New South Wales (AU); Robert Dowle, New South Wales (AU)

(73) Assignee: Sercel Australia Pty Ltd, New South Wales (AU)

( * ) Notice: Subject to any disclaimer, the term of this patent is extended or adjusted under 35 U.S.C. 154(b) by 0 days.

(21) Appl. No.: 10/502,342

(22) PCT Filed: Jan. 24, 2003

(86) PCT No.: PCT/AU03/00073

§ 371 (c)(1),
(2), (4) Date: Jul. 23, 2004

(87) PCT Pub. No.: WO03/062857

PCT Pub. Date: Jul. 31, 2003

(65) Prior Publication Data
US 2005/0146984 A1  Jul. 7, 2005

(30) Foreign Application Priority Data
Feb. 13, 2003  (AU) .................... PS0157

(51) Int. Cl.
G01V 1/38 (2006.01)
(52) U.S. Cl. ............... 367/15; 367/20; 367/21; 367/153; 367/154; 181/110
(58) Field of Classification Search ............ 367/20, 367/15, 153, 154; 181/110
See application file for complete search history.

(56) References Cited

U.S. PATENT DOCUMENTS

| | | | | |
|---|---|---|---|---|
| 3,739,326 A | * | 6/1973 | Kerr et al. ............... 367/159 |
| 3,939,464 A | * | 2/1976 | Swenson ................. 367/154 |
| 4,500,980 A | * | 2/1985 | Copeland ................. 367/154 |
| 4,526,430 A | * | 7/1985 | Williams ................. 439/152 |
| 4,695,787 A | * | 9/1987 | Billet et al. ............. 324/557 |
| 5,046,057 A | * | 9/1991 | Berni ..................... 367/170 |
| 5,265,066 A | * | 11/1993 | Svenning et al. ......... 367/20 |
| 5,400,298 A | | 3/1995 | Hepp ...................... 367/20 |
| 5,600,608 A | * | 2/1997 | Weiss et al. .............. 367/20 |
| 5,796,676 A | * | 8/1998 | Chang et al. ............. 367/20 |
| 5,867,451 A | * | 2/1999 | Chang et al. ............ 367/165 |
| 5,883,857 A | * | 3/1999 | Pearce .................... 367/20 |
| 5,923,616 A | | 7/1999 | Badger et al. ............ 367/16 |
| 6,034,923 A | | 3/2000 | Wooters ................. 367/21 |
| 6,483,775 B1 | * | 11/2002 | Spackman et al. ........ 367/19 |
| 2003/0117025 A1 | * | 6/2003 | Rouquette ............... 307/147 |

FOREIGN PATENT DOCUMENTS

EP        0110230     9/1987
WO        WO 00/56117  9/2000

* cited by examiner

Primary Examiner—Deandra Hughes
Assistant Examiner—Scott A. Hughes
(74) Attorney, Agent, or Firm—Sterne, Kessler, Goldstein & Fox P.L.L.C.

(57) ABSTRACT

An electronic-carrying module (640), for example for use with a seismic data acquisition cable (400), is disclosed. The preferred electronic-carrying module (640) includes, first, an electronics carrier (106) having access means (107) for providing an easy-to-reach access to wrap-around circuitry fitted inside a curved space (104a) within the electronics carrier (106). Second, a pair of rigid end-fittings (102) spaced apart axially by the electronics carrier (106) for connecting to a section of the seismic data acquisition cable (400). And third, an axial hole (100) formed in the electronics carrier (106) and the rigid end-fittings (102) defining the curved space (104a) between the axial hole (100), the access means (107) and the rigid end-fittings (102).

45 Claims, 12 Drawing Sheets

ELECTRONICS-CARRYING MODULE

1. FIELD OF THE INVENTION

The present invention is directed, in general, to the field of electronics packaging. Embodiments of the invention have applications in marine seismic exploration by providing an electronics-carrying module for a seismic data acquisition cable and will be described hereinafter predominantly with reference to this application. However it will be appreciated that this invention is not limited to this particular field of use, for example the invention is also useful in other fields of endeavor such as overhead transmission lines or any anything that embodies electronics in a continuous cable.

2. DESCRIPTION OF THE PRIOR ART

To the best of the inventors' knowledge as at the priority date, there are two main modes of data acquisition arrays or systems for conducting a marine seismic survey. One mode is to adopt a distribution Ocean Bottom Cable data acquisition array that uses mostly 12–24 channels data acquisition, with digitized data transmission in the cable and recording in a central station.

Another mode of data acquisition arrays used in marine geophysical imaging is typically referred to in the art as "streamer cable" or "towed array" or simply as "streamer". Streamers are usually towed behind a sea-going vessel or submarine, and sense acoustic signals originating from a variety of underwater sources. In undersea warfare applications the signal may emanate from other vessels whose natural mechanical actions tend to radiate sound, which in turn may propagate considerable distances through open seawater. This is an example of "passive" detection using streamers. Since the streamers are towed behind a vessel, they are made to have a neutral buoyancy which is typically provided by including a liquid or gel that has a density less than sea water, or by using plastic or glass microspheres embedded in a solid or semi-solid material.

Alternatively, a source of acoustic energy may be used to "insonify" the general vicinity around the streamers which are used to receive reflected acoustic signals from natural or artificial objects in the sea. This particular mode of sensing is important in the detection and imaging of sub-sea structures which in turn is the most effective means presently known for oil exploration. Such streamers are commonly known as "seismic streamers".

In order to perform seismic surveys, a seismic streamer needs to be towed in the water behind a marine seismic vessel. The vessel tows acoustic energy sources such as air guns to generate energy for penetrating subsurface geologic formations, and streamer support hydrophones for detecting energy reflected from the subsurface formations. The streamers typically comprise arrays of hydrophones, buoyancy material, electronic circuitries, such as preampliiers, analog-to-digital converters, electro-optic modulators, data acquisition units and etc., power lines, data transmission lines (electrical wires and/or optical fibres), and strength members.

For three dimensional seismic surveys, several streamers of a number between two and twelve or more are typically deployed simultaneously, each such streamer typically extends between three and twelve kilometers in length. Due to its extreme length, the streamer is divided into a number of separate sealed elongate "sections" or "modules" that can be decoupled from one another and are interconnected end to end to make up the streamer. This module-like structure of the streamer is also very similar to Ocean Bottom Cables. The modules are connected together through connectors which form end fittings in the module ends which physically secure the modules together and also provide for electrical/optical connections between modules so that data and power can pass freely along the length of the streamer.

Prior art electronic circuits formed on printed circuit boards (PCBs) were physically housed in metal canisters located within or between the modules in the streamer. Being metal and containing electronic components, the canisters were relatively heavy. Thus, the canisters were made large (on the order of 4 inches in diameter and $12 \geqq 15$ inches in length) and spacious inside to give the canisters an overall near-neutral buoyancy and a volume large enough to accommodate large rigid PCBs.

Unfortunately, the inter-module canisters had several significant disadvantages. Firstly, the streamer section interconnection must be broken to allow for access to canister electronics for both maintenance and replacement. The breaking of the inter-section connection presents large operational down-time and handling risks, particularly if performed in a deployed state. Second, the canister is a large rigid design which gives rise to a mismatch in its mechanical handling characteristics as compared to the flexible streamer sections. This creates a handling difficulty and is also likely to create mechanical failure points. Third, the system cost is governed partly by the number of canisters needed. Each canister with its associated electronics and connectors is expensive. Thus a system which requires a lesser number of canisters is generally more cost effective.

U.S. Pat. No. 5,400,298 subsequently disclosed an integrated module for a towed hydrophone streamer that eliminates the inter-module canisters by providing a distributed network of interconnected watertight electronics housings or "cans" spread throughout each integrated module of the streamer. Nevertheless, for system maintenance and replacement of failed PCBs, the integrated module of U.S. Pat. No. 5,400,298 does not allow for "easy access" to the PCBs.

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

SUMMARY OF THE INVENTION

The preferred embodiment of the present invention is applicable to both ocean bottom cables and seismic streamers, as well as to both solid and liquid-filled cables.

The preferred embodiment provides an electronics-carrying module with a reduced outer dimension as compared to a conventional canister, but still having a spacious curved interior for carrying bendable, wrap-around circuitry.

The preferred embodiment further provides the above mentioned electronics-carrying module with easy access to the wrap-around circuitry carried inside the electronic carrier. For example, the distributed electronics can be removed or serviced without decoupling or removing the electronics-carrying module, which is a distinctive feature of the preferred embodiment of the present invention not available in the prior art.

Additionally, a preferred embodiment of the present invention provides an electronics packaging solution which accommodates an uninterrupted central strength member running along the entire length of an active section of seismic data acquisition cables.

In accordance with a first aspect of the present invention there is provided an electronics-carrying module in a seismic data acquisition cable including:

an electronics carrier having access means for providing an easy-to-reach access to a wrap-around circuitry fitted inside a curved space within said electronics carrier;

a pair of rigid end-fittings spaced apart axially by said electronics carrier for connecting to a section of said seismic data acquisition cable; and an axial hole formed in said electronics carrier and said rigid end-fittings defining said curved space between said axial hole, said access means and said rigid end-fittings, said axial hole is formed for accommodating a cable with an uninterrupted strength member along said seismic data acquisition cable through said electronics-carrying module.

According to a second aspect of the present invention there is provided an electronics carrying module including:

a carrier defining a space for housing of electronics;

selectively removable access means engagable with said carrier so as to provide access to said space;

a pair of end-fittings spaced apart axially by said carrier for connection of said module to a section of a cable;

said cable having an axially extending strength member; and a hole disposed along said module between said end-fittings, said hole being sized so as to accommodate threading of said cable through said module such that said strength member extends axially through said module;

said access means being operable to provide access to said space without decoupling or removing the module from the cable.

BRIEF DESCRIPTION OF THE DRAWINGS

A preferred embodiment will now be described, by way of example only, with reference to the accompanying drawings in which.

DESCRIPTION OF THE PREFERRED EMBODIMENT

Some sample embodiments of the seismic data acquisition cable of the present invention will now be described in greater detail. Nevertheless, it should be recognized that the present invention can be practiced in a wide range of other embodiments besides those explicitly described, and the scope of the present invention is expressly not limited except as specified in the accompanying claims.

Moreover, while the present invention is illustrated by a number of preferred embodiments directed to seismic streamers, it is not intended that these illustrations be a limitation on the scope or applicability of the present invention. Apart from seismic streamers, the present invention is also applicable to other applications, for example ocean bottom cables and to both solid and liquid-filled types of cables. Further, various parts of the present invention have not been drawn to scale. Certain dimensions have been exaggerated in relation to other dimensions in order to provide a clearer illustration and understanding of the present invention.

Figure 1:
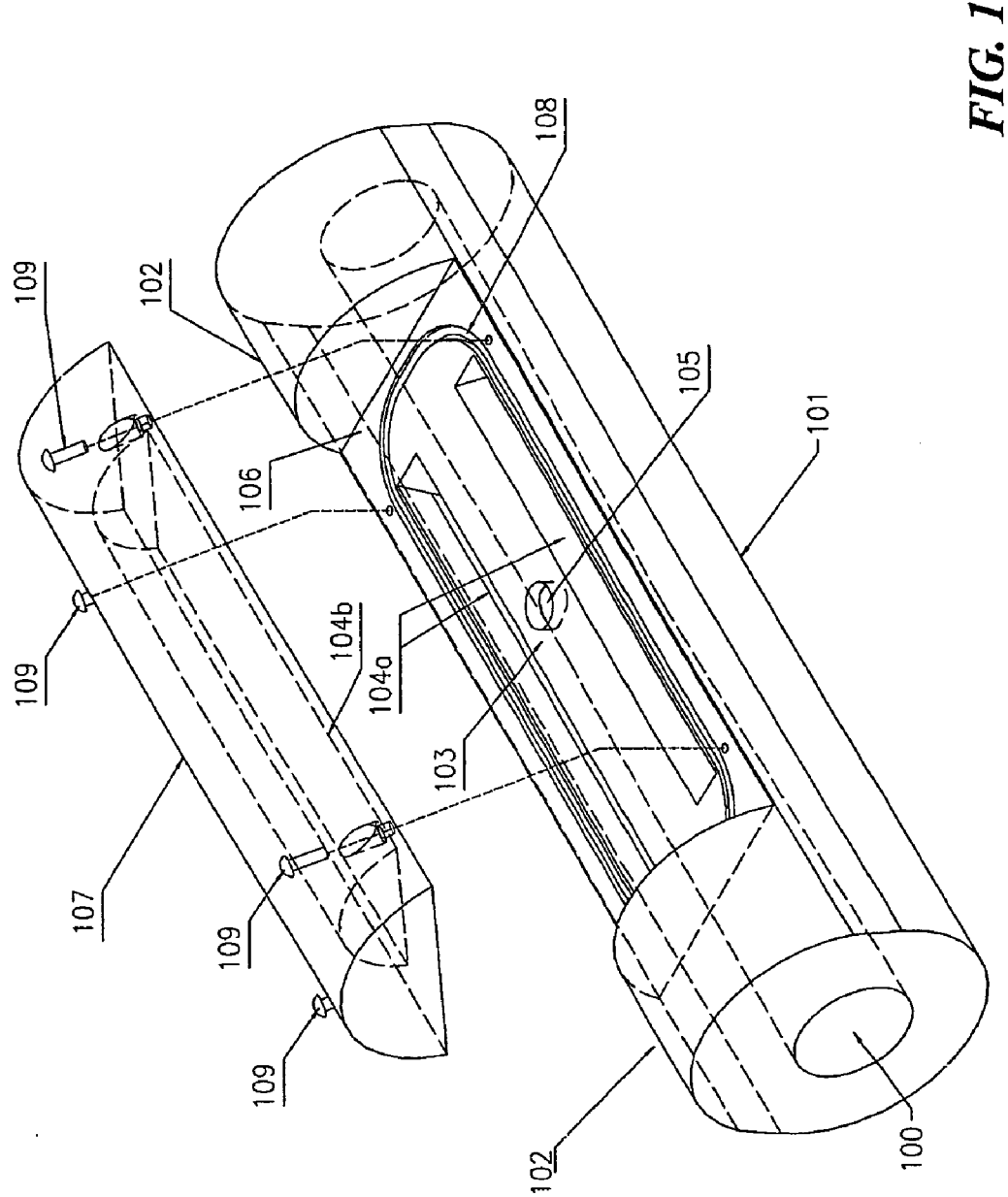
FIG. 1 is a perspective view of an embodiment of the electronics-carrying module according to the present invention.

Referring initially to FIG. 1, illustrated is a perspective view of an embodiment of an electronics-carrying module of the present invention. The electronics-carrying module has an axial hole 100 close to, or in the center of, the electronics-carrying module. The electronics-carrying module further comprises an electronics carrier 101 and a pair of rigid end-fittings 102 spaced apart axially by the electronics carrier 101. The electronics carrier of the present invention is composed of an inner tube 103, in either a cylindrical or polygonal shape, encompassed with an access means for providing an easy-to-reach access to a curved space 104 (104a and 104b) defined in between the inner tube 103, the access means and the pair of rigid end-fittings 102. Wherein, the curved space 104 is used in the present invention as a chamber for housing objects disposed within the electronics-carrying module. Accordingly, the inner tube 103 encloses a major portion of the axial hole 100 and has at least one opening 105 formed thereon. The pair of rigid end-fittings 102 encloses the remaining portion of the axial hole 100.

The access means of the present embodiment comprises a first fractional fluid-resistant tube 106 fixed between the pair of rigid end-fittings 102 and a second fractional fluid-resistant tube 107. The second fractional fluid-resistant tube 107 releasably attaches to the first fractional fluid-resistant tube 106. Sealing means in the form of an elastomer ring 108, for example a rubber ring, is disposed within a recess provided within the first fractional fluid resistant tube 106 such that at least part of the sealing means 108 lies intermediate the first and second fractional fluid resistant tubes 106 and 107. The sealing means 108 assists in the formation of a water tight connection between the first and second fractional fluid resistant tubes 106 and 107.

The second fractional fluid resistant tube 107 is affixed relative to the first second fractional fluid resistant tube by a securing means selected, for example, from one or more of the group consisting of screws, clips, bands, magnets, suction connections and/or adhesive materials such as glues. As shown in FIG. 1, the first embodiment of the present invention uses a screw 109 at each corner as securing means. This arrangement provides a waterproof and gap-free closure. The elastomer ring 108 used in the preferred embodiment can be replaced if worn. If necessary, the ring 108 may be accompanied by a waterproof sealant to maintain and/or reinforce the sealing of the closure.

The curved space 104 is divided into two parts, 104a and 104b in the embodiment illustrated in FIG. 1. The first part 104a is in the first fractional fluid-resistant tube 106 and the second part 104b is in the second fractional fluid-resistant tube 107. The two fractional fluid-resistant tubes make up the access means which define the curved space 104 together with the inner tube 103 and the pair of rigid end-fittings 102. The first fractional fluid-resistant tube 106 shown in FIG. 1 is larger in volume than the second fractional fluid-resistant tube 107. However, in other embodiments the first fractional fluid-resistant tube 106 is smaller in volume than, or equal in volume to, the second fractional fluid-resistant tube 107.

As used in the present specification, the phrase "easy-to-reach access", when used in relation to an electronics-carrying module 640 forming part of a streamer 500, should be construed as access to the module 640 which does not necessitate decoupling of the streamer 500, for example at a termination point 610.

The preferred electronics carrying module includes a carrier 106 defining a space 104a for housing of electronics, for example wrap-around circuitry 301. Selectively removable access means 107 are engagable with the carrier 106 so as to provide access to the space 104a. Additionally, the removable access means 107, when disposed on the carrier 106, provides further space 104b which is continuous with the space 104a defined by the carrier. A pair of end-fittings 102 are spaced apart axially by the carrier 106. The end-fittings allow for connection of the module to a section of a cable 400 which has axially extending strength member 402. A hole 100 is disposed along the module between the end-fittings 102. The hole is sized so as to accommodate threading of the cable 400 through the module such that the strength member 402 extends axially through the module. The access means 107 is operable to provide access to the space 104a without decoupling of the streamer 500, for example at a termination point 610.

The carrier 106 has a substantially cylindrical outer shell 160 and the curved space 104a is disposed intermediate the hole 100 and the outer shell 160.

Figure 2:
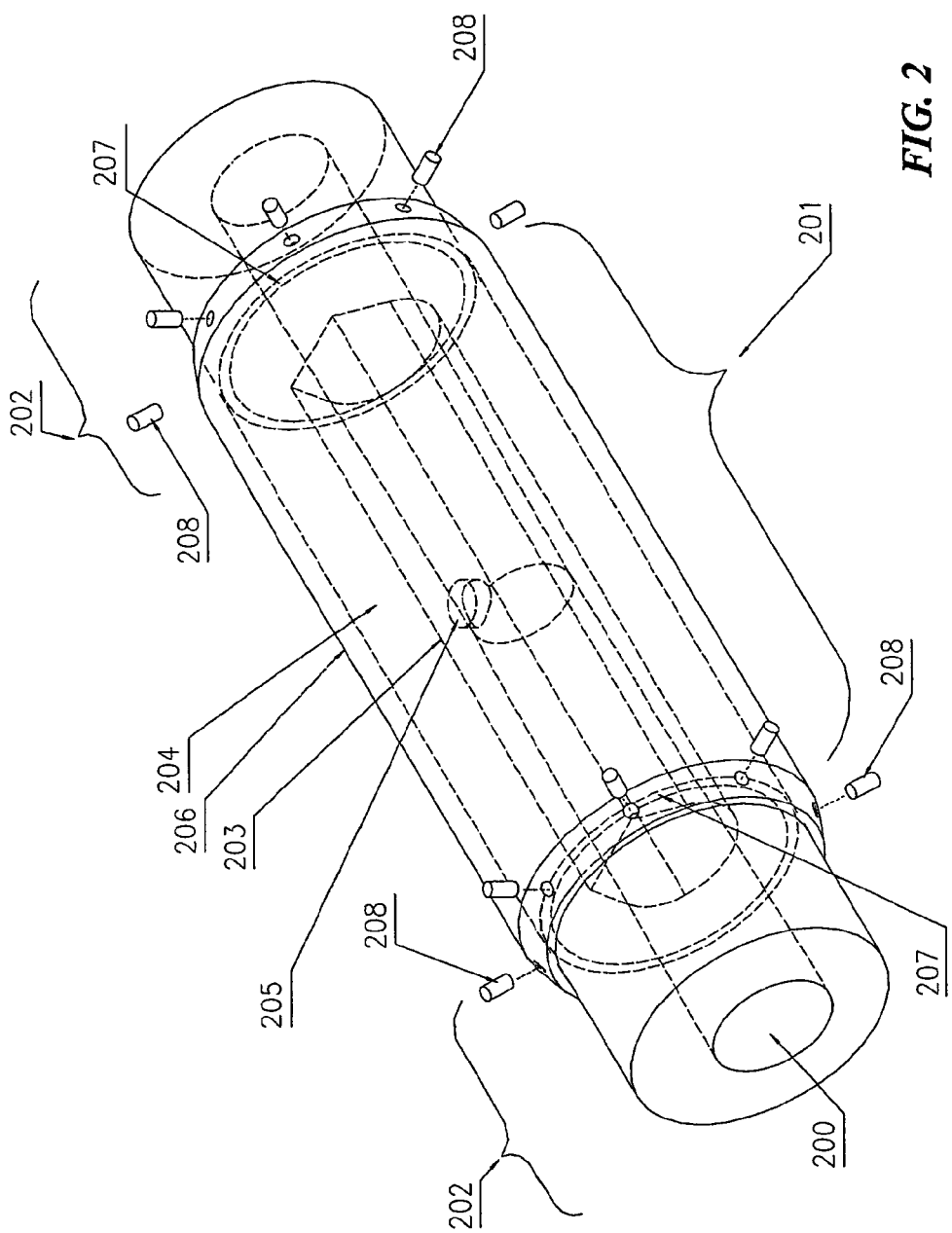
FIG. 2 is a perspective view of another embodiment of the electronics-carrying module according to the present invention.

Referring now to FIG. 2, illustrated is a perspective view of a second embodiment of the electronics-carrying module according to the present invention with an alternate access means design. The electronics-carrying module has an axial hole 200 close to, or in the center of, the electronics-carrying module. The electronics-carrying module further comprises an electronics carrier 201 and a pair of rigid end-fittings 202. The electronics carrier of the present embodiment is also composed of an inner tube 203, in either a cylindrical or polygonal shape, encompassed with another access means for providing easy-to-reach access to a curved space 204 defined in between the inner tube 203, the access means and the pair of rigid end-fittings 202. Accordingly, the inner tube 203 spaces apart the pair of rigid end-fittings 202 axially, encloses a major portion of the axial hole 200 and has at least one opening 205 formed thereon. The pair of rigid end-fittings 202 encloses the remaining portion of the axial hole 200.

The access means of the second embodiment is a movable open-ended cylinder 206 having a diameter slightly larger than any part of the seismic data acquisition cable 400, in particular larger than the diameter of the rigid end-fittings 202. Hence, the movable open-ended cylinder 206 can slide away from the inner tube 203 to expose the curved space 204. The movable open-ended cylinder 206 is attached to the pair of rigid end-fittings 202 by a sealing means and can be detached by removing the sealing means.

An elastomer ring 207, for example a rubber ring, together with a securing means selected from the group consisting of, for example, screws, clips, bands, magnets, suction devices and adhesive materials such as glue, make up the sealing means which secures and seals the movable open-ended cylinder 206 to the pair of rigid end-fittings 202. Two rings 207 are disposed in circumferential slots 220 disposed in each of the rigid end-fittings 202. These O-rings assist sealing between the open ended cylinder 206 and the rigid end-fittings 202. As shown in FIG. 2, the present embodiment uses at least one screw 208 at each end of the movable open-ended cylinder 206. Therefore, by using such combination, a waterproof and gap-free closure is provided. The elastomer ring 207 used in the present embodiment can be replaced if worn. It may also be supplemented by a waterproof sealant for maintaining and/or reinforcing the sealing, if necessary.

Figure 3:
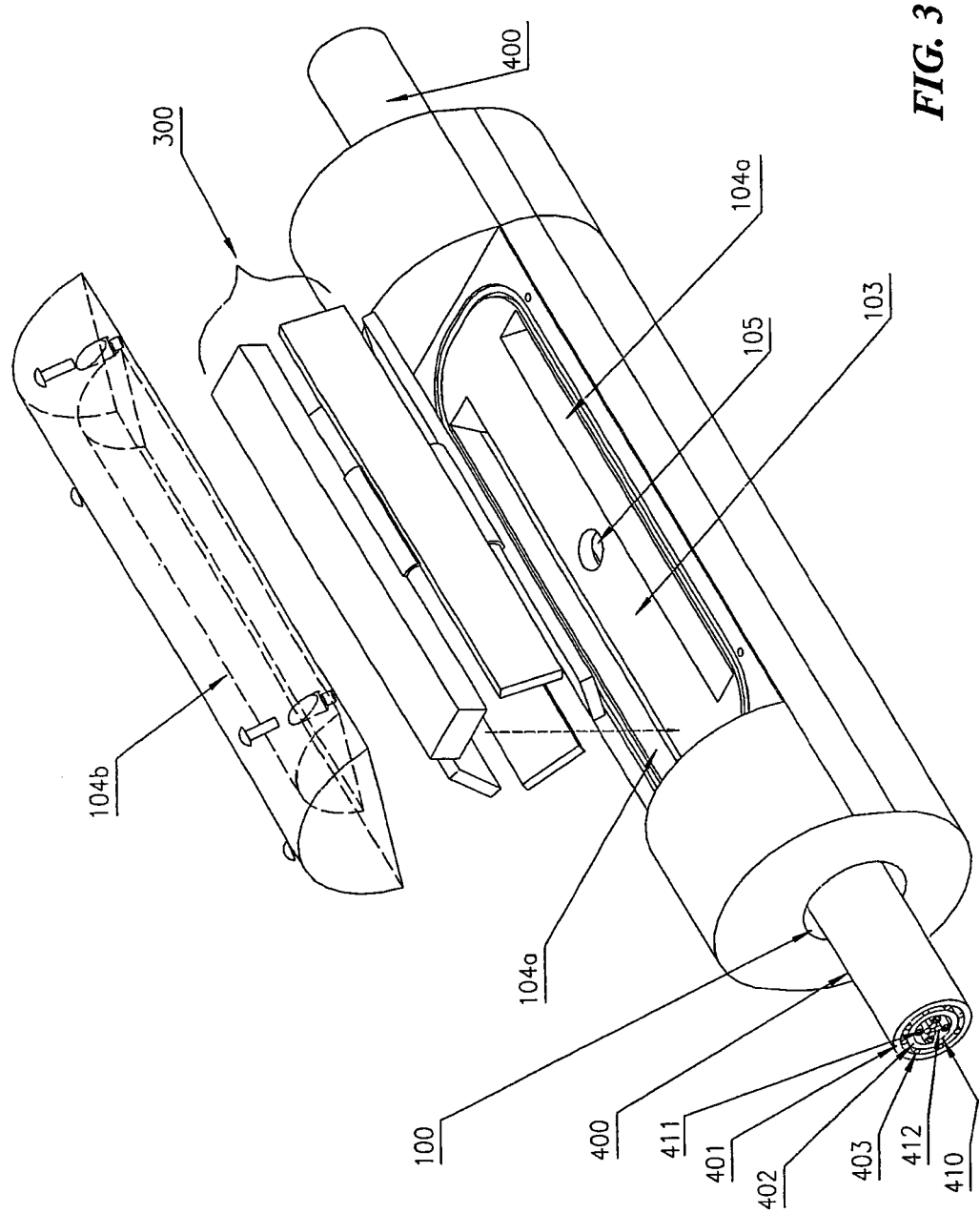
FIG. 3 is a perspective view of the embodiment of FIG. 1 with a seismic data acquisition cable.
Figure 4:
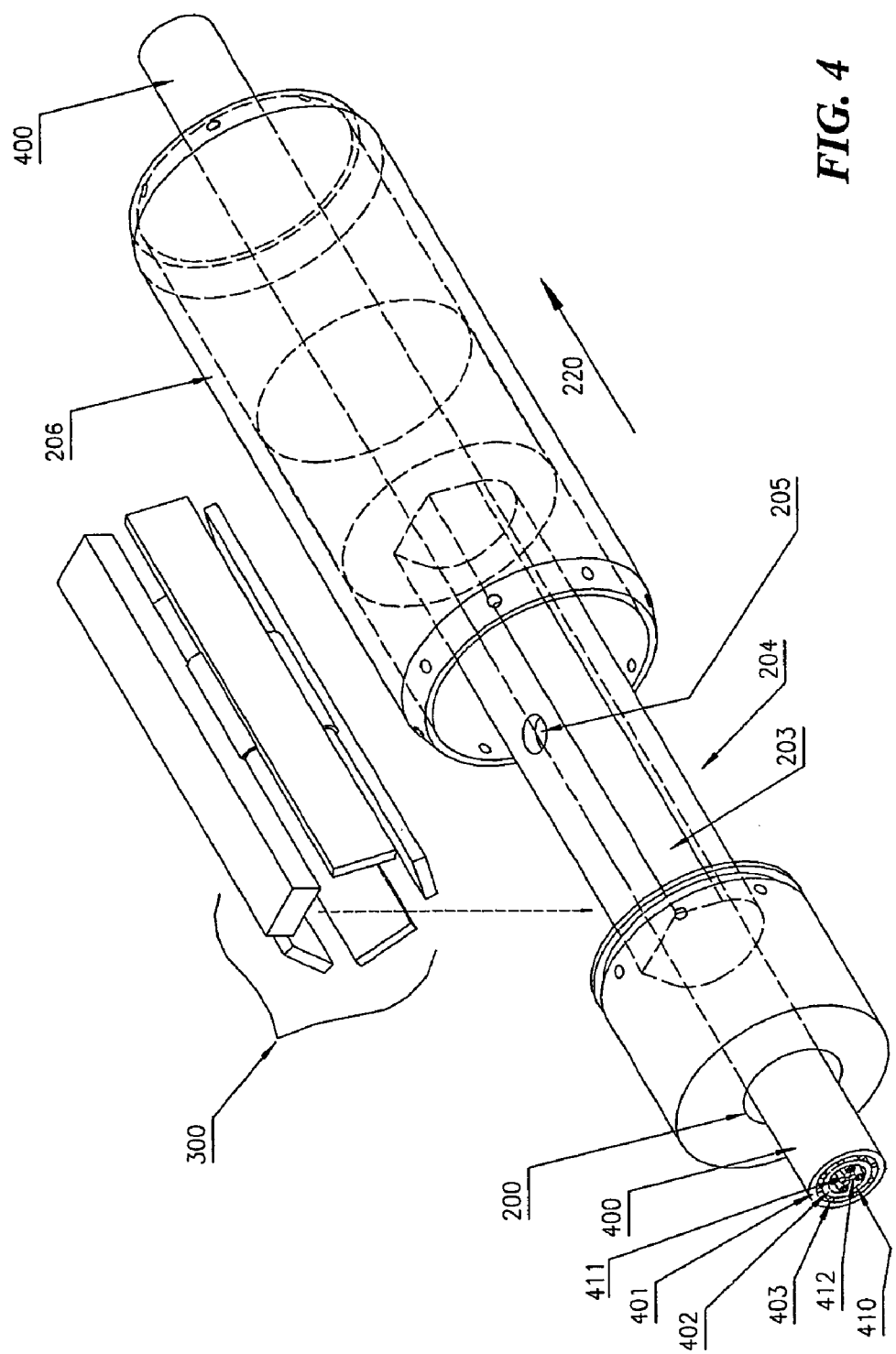
FIG. 4 is a perspective view of the embodiment of FIG. 2 with a the seismic data acquisition cable.

Referring now to FIGS. 3 and 4, illustrated are perspective views of the embodiments of FIGS. 1 and 2 respectively. FIG. 4 further shows the movable open-ended cylinder 206 of FIG. 2 sliding away from the inner tube 203 to expose the curved space 204. The movable open-ended cylinder 206 of FIG. 4 can also slide in a direction opposite to the direction 220 shown. The curved spaces, 104a and 104b of FIG. 3 and 204 of FIG. 4, are used in the present embodiments to house electronic components such as the wrap-around circuitry 300 illustrated in FIGS. 5a, 5b and 5c adjacent to the seismic data acquisition cable 400. The wrap-around circuitry 300 is disposed around the inner tubes, 103 of FIG. 3 and 203 of FIG. 4, thereby ensuring efficient usage of the curved space inside the electronics-carrying module. The electronic components may be coupled to the cable 400 that runs through the axial hole, 100 of FIG. 3 and 200 of FIG. 4, for example to facilitate both power and signal transmission. The wrap-around circuitry 300 is coupled to the cable 400 through the openings, 105 of FIG. 3 and 205 of FIG. 4, on the inner tube, 103 of FIG. 3 and 203 of FIG. 4, by means of wiring and/or pin-socket connectors at the openings, 105 of FIG. 3 and 205 of FIG. 4. The wrap-around circuitry 300 may be secured to the inner tubes, 103 of FIG. 3 and 203 of FIG. 4, by glue or any other securing means mentioned earlier, or by the pin-socket connectors themselves. Moreover, the wrap-around circuitry 300 can be any one or combination of, electronics circuitry/modules, whether well known in the art or not, amplifying circuitry, data acquisition units, analog-to-digital converters, multiplexing circuitry, active control circuitry, power supply circuitry and/or data transmission units, just to name a few. Further, the circuitry 300 may consist of, or include, sensors as described in U.S. Pat. No. 5,400,298, the contents of which are hereby incorporated in their entirety by way of cross-reference.

The cable 400 shown in both FIGS. 3 and 4 has an integrated transmission cable and strength member structure. It provides an electronics packaging solution which accommodates an un-interrupted central strength member running along an entire length of an active section of the seismic data acquisition cable 400. The cable 400 normally comprises a local power and telemetry section 403, a global strength section 402, and a global power and telemetry section 410. As used in this specification, the term "global" means uninterruptedly running along the entire length of an active section, and the term "local" refers to something which has been split at one or more positions along the active section.

The preferred embodiments of the cable 400 shown in both FIGS. 3 and 4 each comprise a cable protective jacket 401, and at least one strength member 402, also referred to as a global strength section, running along the entire length of the cable 400 underneath the cable protective jacket 401. The strength member 402 is used to withstand the pulling forces generated by a towed object, it has an outer coating jacket which surrounds a metallic cord, synthetic cord, glass reinforced plastic, glass/resin composite structure, synthetic braid or any other material/composition that serves the same function. Intermediate the cable protective jacket 401 and the strength member 402 there is formed a plurality of integrated signal and power transmission lines 403, and this region is referred to as the local power and telemetry section. The integrated signal and power transmission lines 403 comprise metal wiring such as copper wires. The copper wires are split along the cable 400, in particular at the openings 105 of FIG. 3 and 205 of FIG. 4, for providing power to and signal transmission to and from the wrap-around circuitry 300. The global power and telemetry section 410 normally comprises at least one global power line 411 and at least one optical fibre 412, which is all disposed within the strength member 402, as shown in the drawings, or by its side, like the local power and telemetry section 403.

Figure 5A:
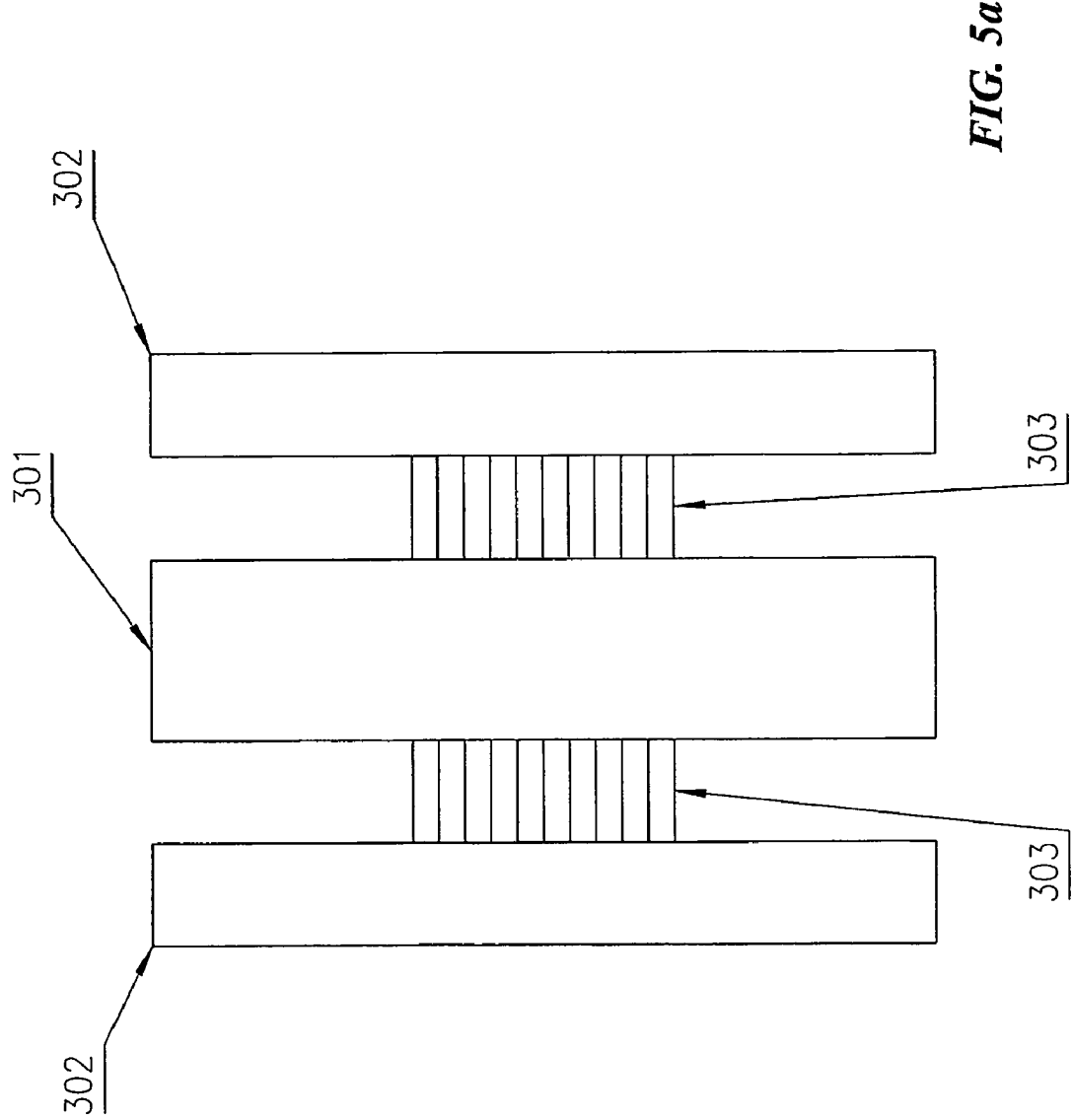
FIG. 5a is a layout view of an embodiment of wrap-around circuitry according to the present invention.
Figure 5B:
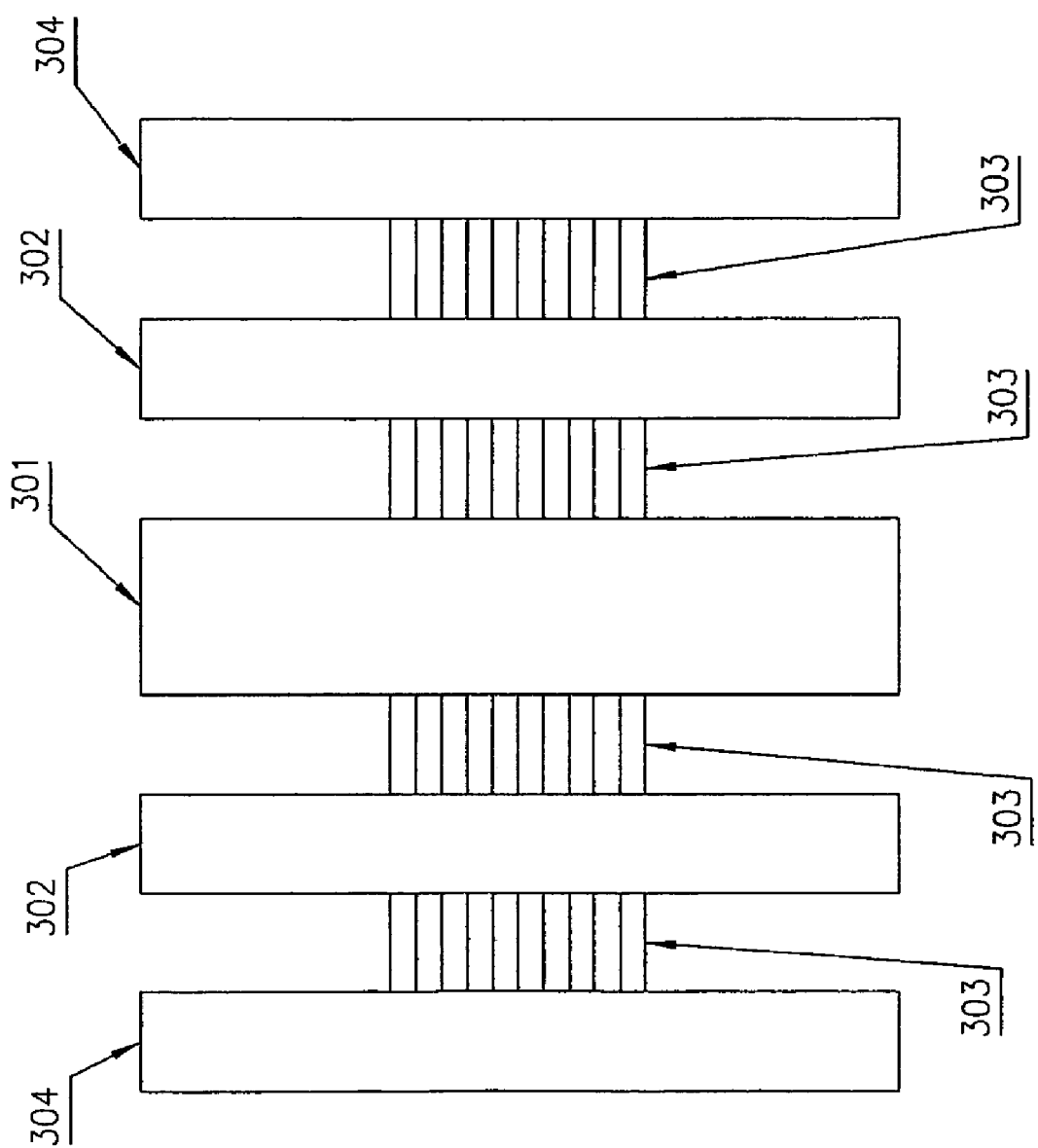
FIG. 5b is a layout view of an alternate embodiment of wrap around circuitry.
Figure 5C:
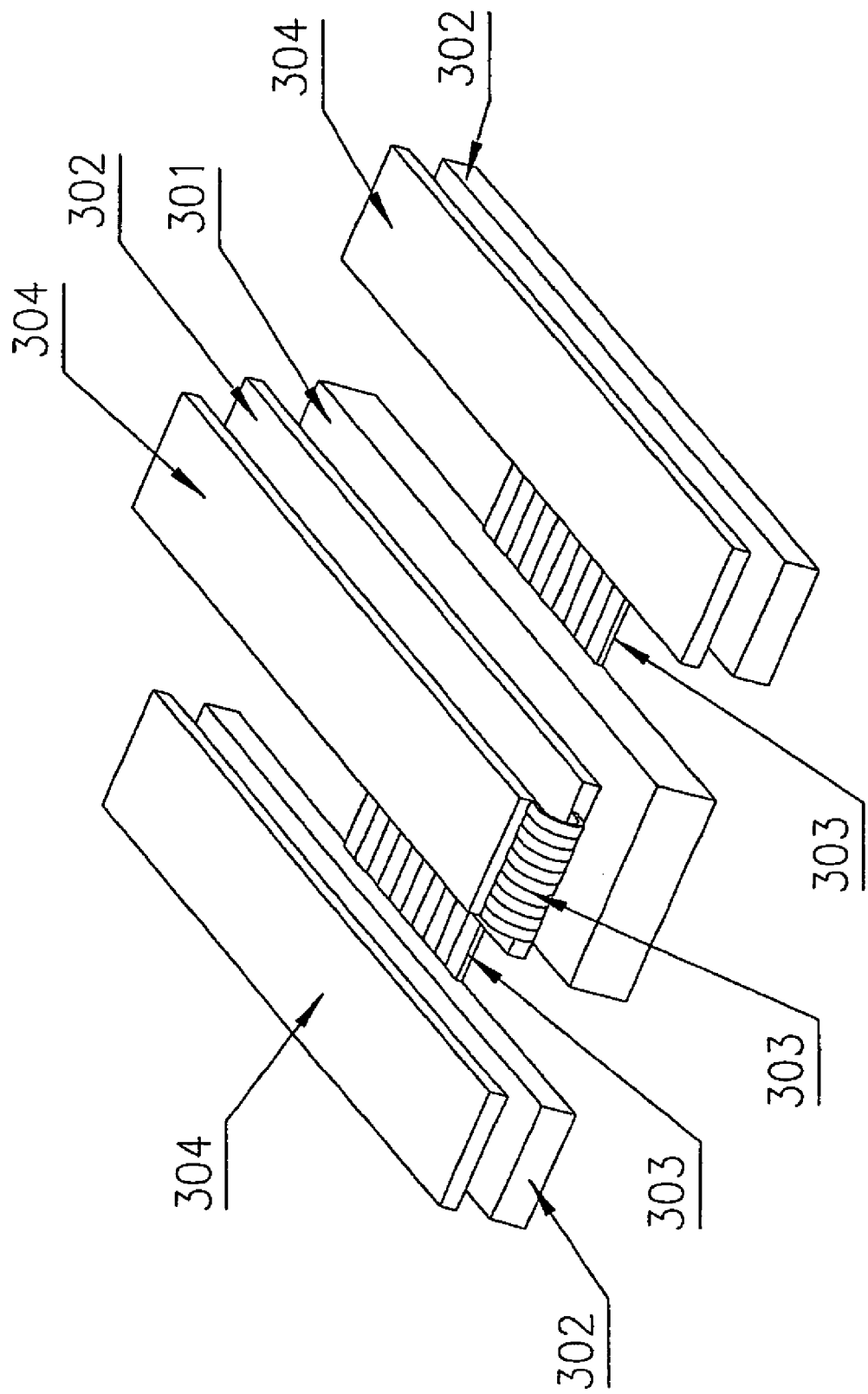
FIG. 5c is a layout view of another alternate embodiment of wrap around circuitry.

Referring now to FIGS. 5a, 5b and 5c, illustrated are layout views of some sample embodiments of wrap-around circuitry according to the present invention. The wrap-around circuitry comprises a first rigid circuit board 301 with a connection (not shown) for connecting the wrap-around circuitry to the cable by means of wiring and/or pin-socket connectors, and a second rigid circuit board 302 joined to the first rigid circuit board 301 by a connection means 303. The wrap-around circuitry further comprises a plurality of other rigid circuit boards 304, each joined to either one or two adjacent rigid circuit boards by the same connection means 303. The connection means 303 is a bendable conductor selected from the group consisting of a bunch of wires in a ribbon cable, a flexible printed circuit board, or a fixed connector such as a pin-socket connector. With such connection means the rigid circuit boards can be spread across, stacked up one on top of another or a combination of spreading across and stacking up. Hence, a variety of wrap-around circuitry structures can be obtained as long as the wrap-around circuitry can fit into the curved space 104a, 104b or 204 of the electronics-carrying module. Moreover, the circuit boards used to construct the wrap-around circuitry of the present invention are not restricted to any rigid shape. The circuit board may alternatively be a single flexible printed circuit board.

Figure 6:
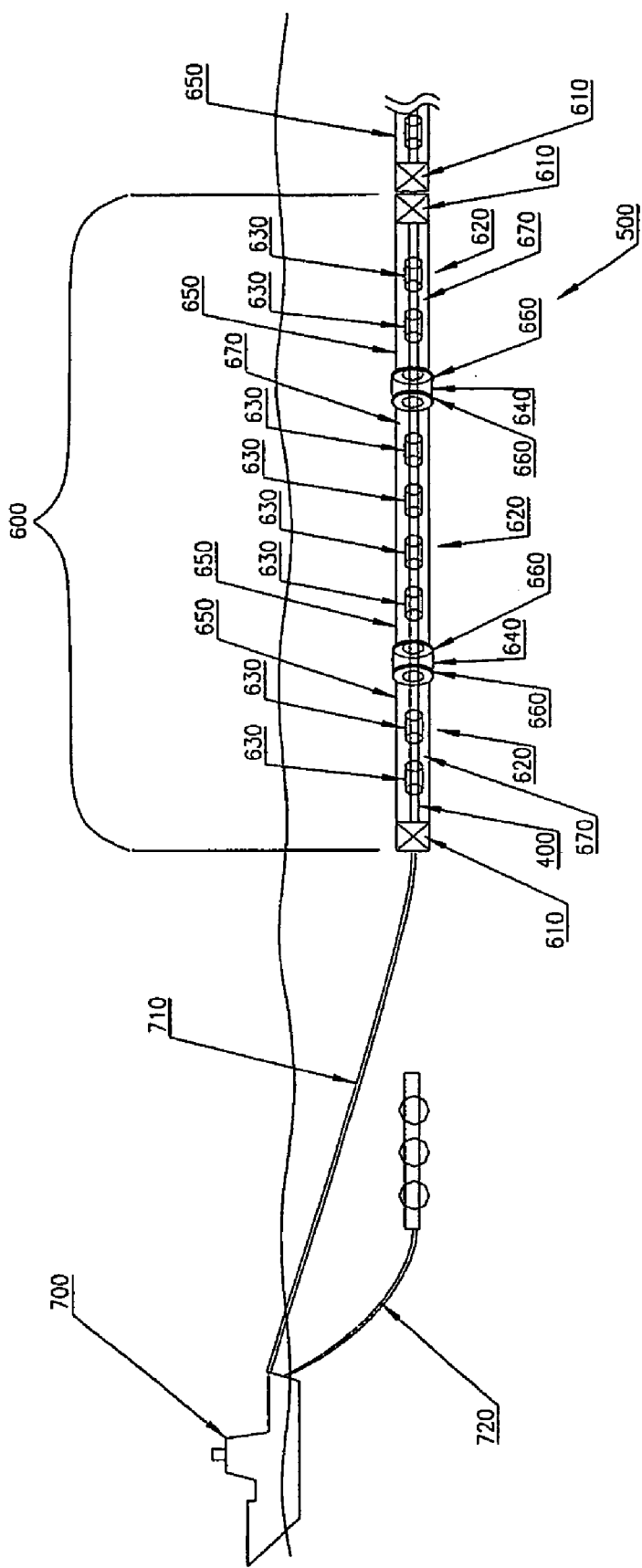
FIG. 6 is a schematic overview of a seismic streamer assembly towed behind a vessel.

Referring to FIG. 6, illustrated is an schematic elevational view including the active section 600 of a seismic streamer 500, with preferred embodiments of modules 640 disposed on a seismic data acquisition cable 400. A seismic vessel 700 tows the seismic data acquisition cable, also referred to as a seismic streamer 500, by way of a tow cable 710. The seismic vessel 700 also tows an array of acoustic energy sources 720 such as air guns to generate energy for penetrating subsurface geologic formations. The seismic streamer 500 supports a number of active sections 600 by joining one termination 610 to another for detecting energy reflected from the subsurface formations.

The active section 600 of the present embodiment comprises a plurality of sensor group assemblies 620. Each sensor group assembly 620 further comprises a plurality of sensor device carriers 630 distributed in a spaced-apart relationship along each of the sensor group assemblies. Moreover, each of the sensor device carriers 630 has a central axial hole formed therein for allowing the cable 400 to run through, and each carrying at least one sensor device. The sensor device may include, for example, a hydrophone of the type commonly used in marine seismic surveys. Such hydrophones include but are not limited to those which operate using fibre optics or piezoelectric phenomena. The sensor devices may also include at least one non-acoustic sensor, for example, thermal sensors, pressure sensors, magnetic heading sensors, gravitational sensors or velocity/acceleration sensors such as geophones.

A plurality of the electronics-carrying modules 640 as shown FIGS. 1 and/or 2 are mounted onto the tow cable 710. The electronics-carrying modules 640 are distributed along the active section 600 of the seismic streamer 500 and in between two sensor group assemblies. The cable 400 of FIGS. 3 and 4 is positioned so as to extend along the entire length of the active section 600 through the sensor group assembly 620 and through the axial hole in each of the electronics-carrying modules 640. An outermost protective layer 650 is disposed around the cable 400 and around the sensor group assembly 620 to protect the cable and the sensor group assembly from the external environment. Moreover, although not shown in FIG. 6, the outermost protective layer can also cover over the electronics-carrying modules for the same purpose. The outermost protective layer 650 is formed by extruding a material from a group containing polyurethane, polyethylene, polycarbonate, polyacrylate and similar materials for avoiding sea-water leakage. A metal ring 660 is provided for clamping an end of the outermost protective layer 650 to the rigid end-fitting of the electronics-carrying module 640. A buoyant segment 670 is formed to fill the void underneath the outermost protective layer 650 and for providing a desired buoyancy level. The buoyant segment 670 can be a liquid material such as hydrocarbon fluid, or a solid material such as polyurethane composite, or any material in between the liquid and solid states, such as a gel-type material. The buoyant segment 670 is normally not required if the seismic data acquisition cable is employed in other applications such as an ocean bottom cable. A strength reinforcing layer (not shown) is disposed over the outermost protective layer 650. In some embodiments a strength reinforcing member such as corrosion-resistant steel wire rope is used, particularly for reinforcing the ocean bottom cable. An end-termination member 610 is disposed at each end of the active section 600 for coupling either to the tow cable 710 or to the end-termination member of another active section to form the seismic streamer 500.

Figure 7:
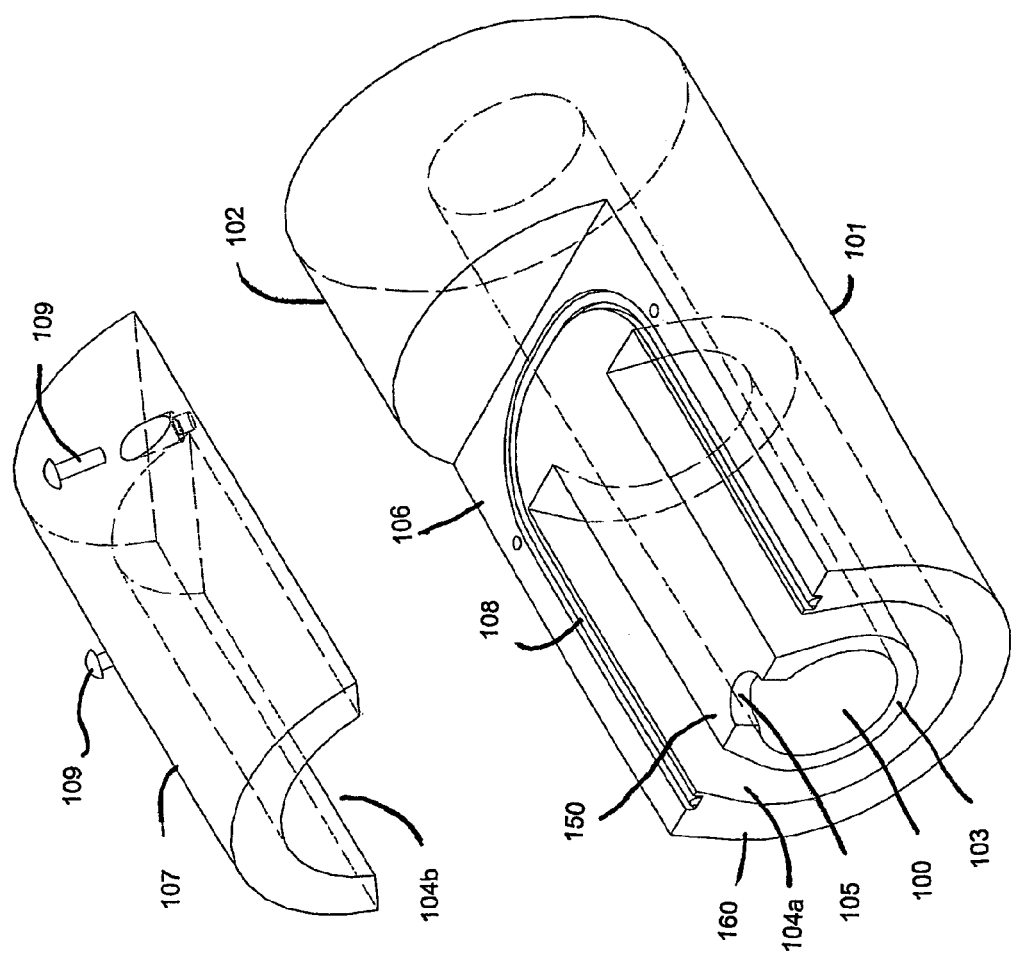
FIG. 7 is a cross sectional perspective view of the embodiment illustrated in FIG. 1, with the cross section taken transversely at the longitudinal mid-point.

FIG. 7 illustrates a cross section of the embodiment of the electronics carrying module shown in FIG. 1, with hidden detail shown by the dotted lines. This embodiment of the invention is suited for applications in which a relatively large volume of electronics must be housed within the module, for example the wrap around circuitry shown in FIGS. 5b and 5c.

The complexity of the cavity 104a in the embodiment illustrated in FIGS. 1 and 7 makes extraction of a negative pattern according to standard molding and casting techniques difficult or impossible. For this reason, this embodiment is preferably manufactured by means of investment-type casting, although other manufacturing methods may also suffice. As will be appreciated by those skilled in the art, investment-type casting requires a sacrificial negative pattern to be formed from a material such as ceramics or wax, for example. Once the material which forms the module is fed into the negative pattern and solidifies, the negative pattern is destroyed as it is removed, for example it is melted in the case of wax, or it is chipped away in the case of a negative formed from a thin ceramic shell.

Figure 9:
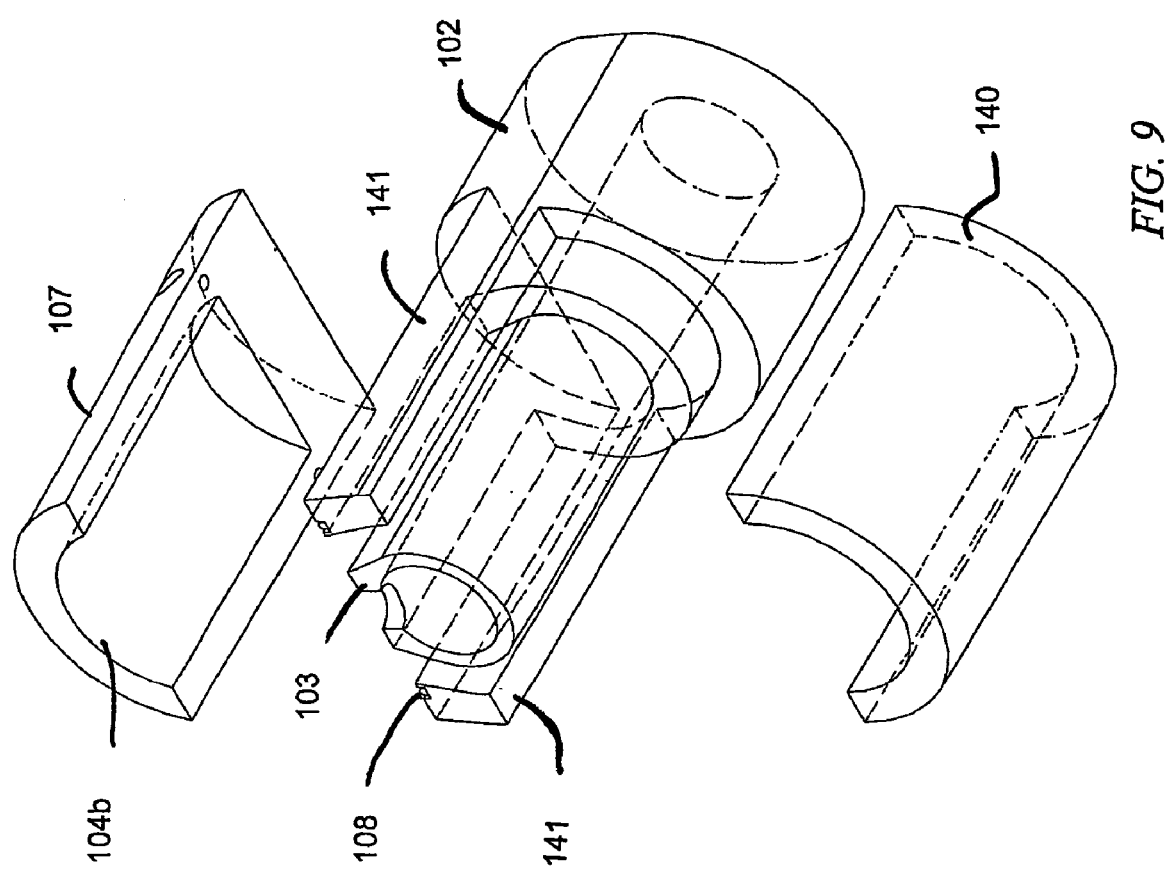
FIG. 9 is a cross sectional perspective view of an alternative embodiment similar to that illustrated in FIG. 1.

The embodiment illustrated in FIG. 9 shows an alternative arrangement which can be assembled into a functionally identical embodiment to that illustrated in FIGS. 1 and 7, but which allows for greater manufacturing freedom. The main difference is that the lower shell 140 is initially manufactured separately of the rest of the module. This allows alternative manufacturing techniques, such as machining from solid materials, casting and molding, to be utilized in addition to the option of investment-type casting. Once the components have been manufactured, the lower shell 140 is permanently attached to the upper assembly 141 to form the embodiment illustrated in FIGS. 1 and 7. This attachment may be achieved by means of fasteners such as screws and/or adhesives such as glues.

Figure 10:
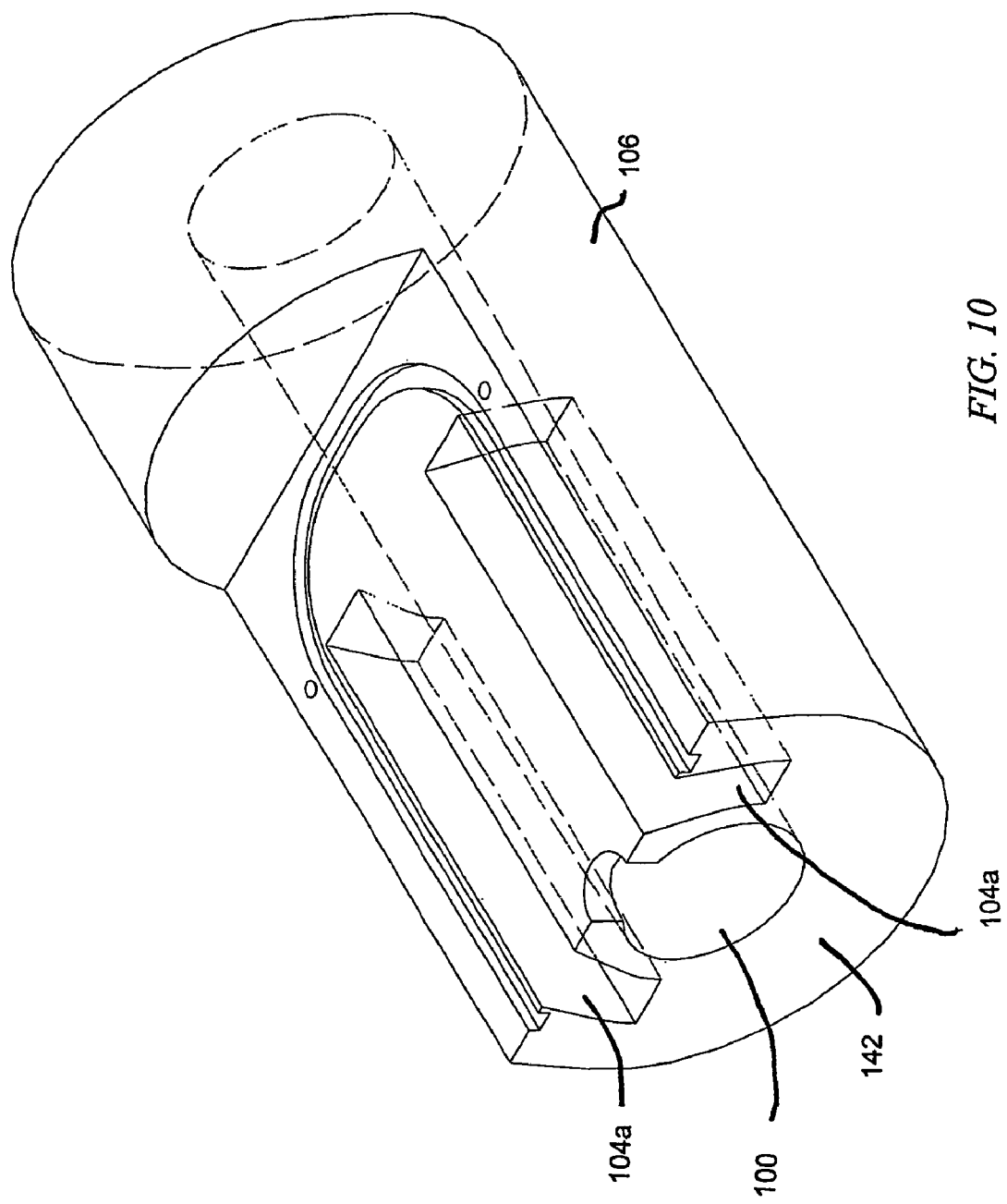
FIG. 10 is a cross sectional perspective view of yet another alternative embodiment similar to that illustrated in FIG. 1.

FIG. 10 illustrates another embodiment similar to that shown in FIG. 1, but suited to applications wherein electronics of a smaller volume are to be housed within the module, for example the wrap around circuitry shown in FIG. 5*a*. In this embodiment the lower half 142 of the module is solid, with the exception of the axial hole 100. The curved space 104*a* in the first fractional fluid resistance tube 106 is provided by two slots. This less complex cavity 104*a* allows for a greater range of manufacturing freedom. This embodiment may be manufactured from techniques such as machining from solid materials, casting and molding. Another advantage associated with this embodiment is that the solid lower half 142 promotes greater mechanical stiffness and strength. Therefore, this embodiment of the module may be manufactured either with greater strength as compared to other embodiments, or with a similar strength, but from weaker and less expensive materials.

Figure 8:
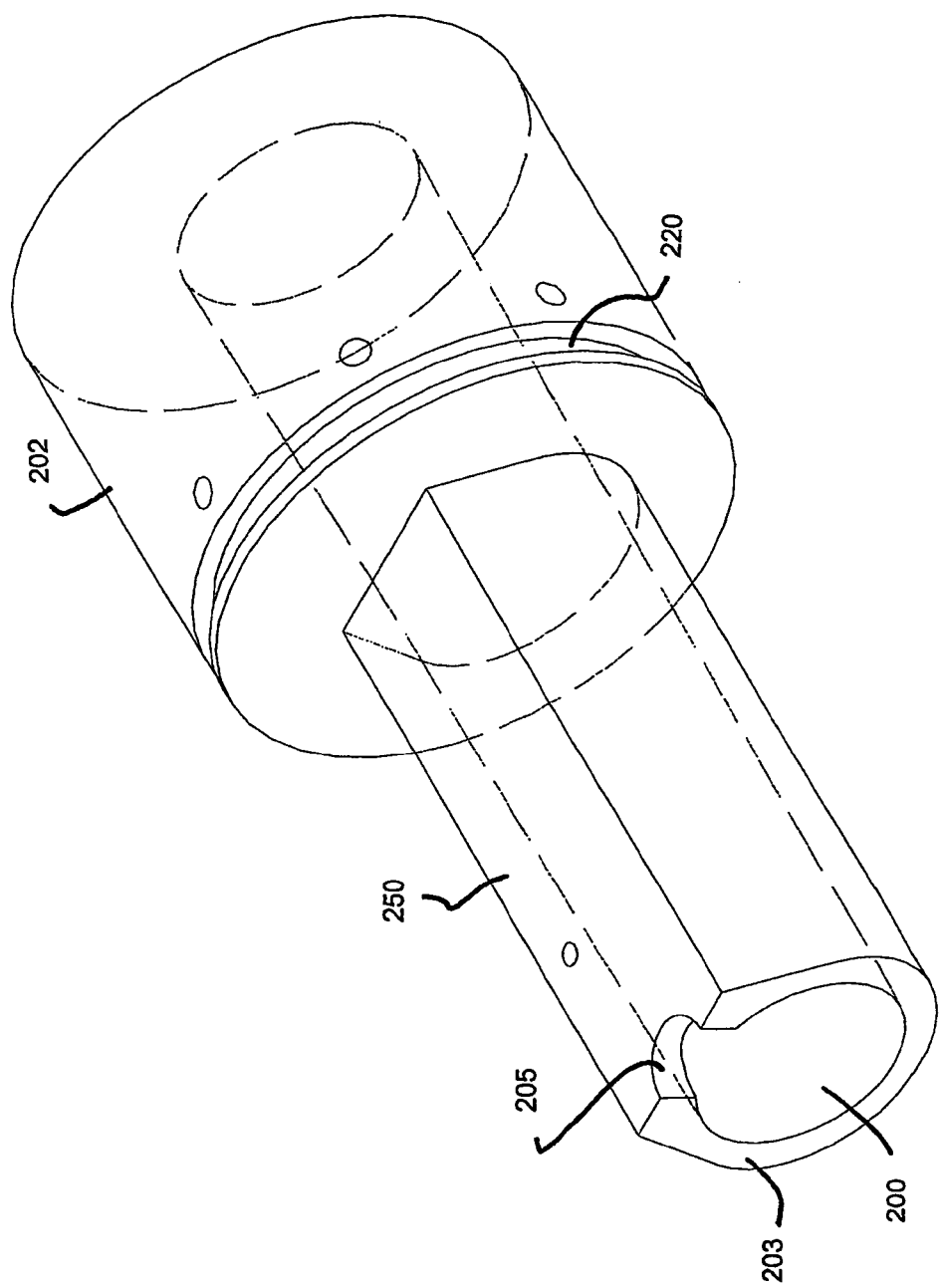
FIG. 8 is a cross sectional perspective view of the embodiment illustrated in FIG. 2, with the cross section taken transversely at the longitudinal mid-point.

FIG. 8 illustrates a cross section of the embodiment of the electronics carrying module shown in FIG. 2, with hidden detail shown by the dotted lines. The movable open-ended cylinder 206 is omitted from FIG. 8 for the sake of clarity. This embodiment may be manufactured by a variety of techniques, such as machining from solid materials, casting and molding.

The inner tubes 103 and 203 of the various illustrated embodiments include a flat upper surface, labeled 150 for the first embodiment and 250 for the second embodiment, which is adapted for abutment of a central rigid circuit board 301 as illustrated in each of FIGS. 5*a*, 5*b* and 5*c*. The adjacent rigid circuit boards 302, 304 etc, are then threaded into the curved space, 104*a* for the first embodiment and 204 for the second embodiment. In yet other embodiments, the central rigid circuit board 301 is an interface board which is adapted to interface with electronics from the cable 400 through opening 105 or 205. The interface board 301 is preferably fixedly attached to the flat upper surface 150 or 250 The interface board 301 has means for electrical attachment of additional printed circuit boards 302, 304, etc thereto. The interface board 301 advantageously provides for improved electrical continuity between the electronics within the cable 400 and the electronics within the rigid circuit boards 302, 304, etc.

The material used to form the preferred embodiments is preferably selected from a group including plastics and metals, particularly titanium or stainless steel.

Although specific embodiments have been illustrated and described, it will be obvious to those skilled in the art that various modifications may be made without departing from what is intended to be limited solely by the appended claims.

The claims defining the invention are as follows:

1. An electronics-carrying module in a seismic data acquisition cable including:
    an electronics carrier having access means for providing an easy-to-reach access to a wrap-around circuitry fitted inside a curved space within said electronics carrier;
    a pair of rigid end-fittings spaced apart axially by said electronics carrier for connecting to a section of said seismic data acquisition cable;
    an axial hole formed in said electronics carrier and said rigid end-fittings defining said curved space between said axial hole, said access means and said rigid end-fittings, said axial hole is formed for accommodating a cable with and uninterupted strength member along said seismic data acquisition cable through said electronics-carrying module; and
    an inner tube enclosing a major portion of said axial hole and having at least one opening thereon for connecting said wrap-around circuitry to said cable for both power and signal transmission.

2. The electronics-carrying module in accordance with claim 1, wherein said access means comprises:
    a first fractional fluid-resistant tube fixed between said pair of rigid end-fittings; and
    a second fractional fluid-resistant tube joined to said first fractional fluid-resistant tube by sealing means so as to form said curved space between said inner tube and said access means.

3. The electronics-carrying module in accordance with claim 2, wherein said second fractional fluid-resistant tube can be detached from said first fractional fluid-resistant tube by removing said sealing means.

4. The electronics-carrying module in accordance with claim 3, wherein said first fractional fluid-resistant tube is larger in volume than said second fractional fluid-resistant tube.

5. The electronics-carrying module in accordance with claim 3, wherein said first fractional fluid-resistant tube is smaller in volume than said second fractional fluid-resistant tube.

6. The electronics-carrying module in accordance with claim 3, wherein said first fractional fluid-resistant tube is equal in volume to said second fractional fluid-resistant tube.

7. The electronics-carrying module in accordance with claim 3, wherein said sealing means comprise an elastomer ring such as rubber ring.

8. The electronics-carrying module in accordance with claim 3, wherein said sealing means comprise a waterproof sealant.

9. The electronics-carrying module in accordance with claim 7, wherein said sealing means further comprise a plurality of securing means selected from the group consisting of screw, clip, band, magnet, suction and adhesive material.

10. The electronics-carrying module in accordance with claim 1, wherein said access means is a movable open-ended cylinder having a diameter slightly larger than said section of said seismic data acquisition cable so that said movable open-ended cylinder can slide away from said inner tube to expose said wrap-around circuitry, said movable open-ended cylinder is attached to said pair of rigid end-fittings by means of sealing and can be detached by removing said means of sealing.

11. The electronics-carrying module in accordance with claim 10, wherein said sealing means comprise an elastomer ring such as rubber ring.

12. The electronics-carrying module in accordance with claim 10, wherein said sealing means comprise a waterproof sealant.

13. The electronics-carrying module in accordance with claim 11, wherein said sealing means further comprise a plurality of securing means selected from the group consisting of screw, clip, band, magnet, suction and adhesive material.

14. The electronics-carrying module in accordance with claim 1, wherein said inner tube is a cylindrical tube.

15. The electronics-carrying module in accordance with claim 1, wherein said inner tube is a polygonal tube.

16. The electronics-carrying module in accordance with claim 1, wherein said wrap-around circuitry comprises:
a first circuit board with a connection for connecting said wrap-around circuitry to said cable through said opening; and
means for securing said first circuit board to said inner tube.

17. The electronics-carrying module in accordance with claim 16, wherein said wrap-around circuitry further comprises a second circuit board joined to said first circuit board by a connection means.

18. The electronics-carrying module in accordance with claim 17, wherein said wrap-around circuitry further comprises a plurality of other circuit boards joined one to another to said first circuit board by said connection means.

19. The electronics-carrying module in accordance with claim 18, wherein said connection means comprise a bendable conductor selected from the group consisting of a bunch of wires in a ribbon cable and a flexible printed circuit board.

20. The electronics-carrying module in accordance with claim 18, wherein said connection means comprise a fixed connector such as a pin-socket.

21. The electronics-carrying module in accordance with claim 16, wherein said first circuit board is a rigid circuit board.

22. The electronics-carrying module in accordance with claim 16, wherein said first circuit board is a flexible circuit board.

23. The electronics-carrying module in accordance with claim 17, wherein said second circuit board is a rigid circuit board.

24. The electronics-carrying module in accordance with claim 17, wherein said second circuit board is a flexible circuit board.

25. The electronics-carrying module in accordance with claim 18, wherein said plurality of other circuit boards are rigid circuit boards.

26. The electronics-carrying module in accordance with claim 18, wherein said plurality of other circuit boards are flexible circuit boards.

27. The electronics-carrying module in accordance with claim 1, wherein said wrap-around circuitry includes amplifying circuitry.

28. The electronics-carrying module in accordance with claim 1, wherein said wrap-around circuitry includes a data acquisition unit.

29. The electronics-carrying module in accordance with claim 1, wherein said wrap-around circuitry includes an analog-to-digital converter.

30. The electronics-carrying module in accordance with claim 1, wherein said wrap-around circuitry includes a multiplexing circuitry.

31. The electronics-carrying module in accordance with claim 1, wherein said wrap-around circuitry includes a data transmission unit.

32. The electronics-carrying module in accordance with claim 1, wherein said wrap-around circuitry includes active control circuitry.

33. The electronics-carrying module in accordance with claim 1, wherein said wrap-around circuitry includes power supply circuitry.

34. The electronics-carrying module in accordance with claim 1, wherein said section of said seismic data acquisition cable comprises:
a portion of said cable; and
an outermost protective layer around said portion of said cable for protecting said cable from the outside environment.

35. The electronics-carrying module in accordance with claim 34, wherein said rigid end-fitting is connected to said section of said seismic data acquisition cable by clamping said outermost protective layer to said rigid end-fitting.

36. The electronics-carrying module in accordance with claim 34, wherein said section of said seismic data acquisition cable further comprises a buoyant segment formed to fill the void underneath said outermost protective layer for providing a desired buoyancy level.

37. The electronics-carrying module in accordance with claim 34, wherein said section of said seismic data acquisition cable further comprises a layer of strength reinforcing member above said outermost protective layer, such as corrosion-resistant steel wire ropes.

38. The electronics-carrying module in accordance with claim 36, wherein said buoyant segment includes a liquid material such as hydrocarbon fluid.

39. The electronics-carrying module in accordance with claim 36, wherein said buoyant segment includes a solid material such as polyurethane composite.

40. The electronics-carrying module in accordance with claim 36, wherein said buoyant segment includes a gel-type material.

41. An electronics-carrying module including:
a carrier defining a space for housing of electronics;
selectively removable access means engagable with said carrier so as to provide access to said space;
a pair of endfittings spaced apart axially by said carrier for connection of said module to a section of a cable;
said cable having an axially extending strength member;
a hole disposed along said module between said end-fittings, said hole being sized so as to accommodate threading of said cable through said module such that said strength member extends axially through said module;
an inner tube enclosing a major portion of said hole and having at least one opening thereon for connecting said electronics to said cable, said space being intermediate said inner tube, said access means and said end fittings; and
said access means being operable to provide access to said space without decoupling or removing the module from the cable.

42. An electronics-carrying module according to claim 41 wherein said carrier has a substantially cylindrical outer shell.

43. An electronics-carrying module according to claim 42 wherein said space is disposed intermediate said hole and said outer shell.

44. An electronics-carrying module according to claim 41 wherein said electronics is wrap-around circuitry.

45. An electronics-carrying module according to claim 41 wherein said access means is operable to provide access to said space without decoupling of the streamer at a termination point.

* * * * *